United States Patent
Abels

[11] Patent Number: 5,921,340
[45] Date of Patent: Jul. 13, 1999

[54] INDUSTRIAL TRUCK WITH A SWIVELLING DRIVER'S SEAT

[75] Inventor: Theodor Abels, Aschaffenburg, Germany

[73] Assignee: Linde Aktiengesellschaft

[21] Appl. No.: 08/820,708

[22] Filed: Mar. 18, 1997

[30] Foreign Application Priority Data

Mar. 21, 1996 [DE] Germany .............................. 196 11 207
Dec. 4, 1996 [DE] Germany .............................. 196 50 338

[51] Int. Cl.[6] .............................. B60N 2/38; B60K 26/00
[52] U.S. Cl. ........................................... 180/326; 180/329
[58] Field of Search ...................... 180/326, 329, 180/330

[56] References Cited

U.S. PATENT DOCUMENTS 3,254,900  6/1966  Allen ....................................... 180/329

FOREIGN PATENT DOCUMENTS 1022623  3/1966  United Kingdom ................... 180/329

Primary Examiner—Kenneth R. Rice
Attorney, Agent, or Firm—Webb Ziesenheim Logsdon Orkin & Hanson, P.C.

[57] ABSTRACT

An industrial truck, in particular a front seat forklift truck, has a driver's seat which can swivel around an at least approximately vertical axis of rotation. A foot space for the operator's feet which corresponds to the driver's seat. The axis of rotation is at some distance from the driver's seat and is closer to the foot space than to the driver's seat. The axis of rotation is preferably located in the vicinity of a pedal for reverse travel. In one embodiment, the pedal is swivelled along with the driver's seat.

20 Claims, 3 Drawing Sheets

INDUSTRIAL TRUCK WITH A SWIVELLING DRIVER'S SEAT

BACKGROUND OF THE INVENTION

1. Field of the Invention

This invention relates to an industrial truck, in particular to the driver's seat of a forklift truck. The driver's seat can be swivelled around an axis of rotation which is at least approximately vertical. A foot space for the operator's feet corresponds to the driver's seat.

2. Background Information

The driver's seat of an industrial truck is generally located in an open or closed driver's cab. A number of control elements, such as a steering wheel and various switches and levers, are located in the vicinity of the driver's seat within reach of the driver's hands. When the operator is seated on the driver's seat in a natural position, the operator's feet are in a foot space. In the vicinity of the foot space, there are generally foot pedals and/or a shelf for the operator's feet.

During the operation of an industrial truck, situations frequently occur in which the driver's view must be directed toward the side or toward the rear, sometimes for extended periods. On forklift trucks, in particular for the transport of large loads which interfere with a clear view, it is frequently necessary to travel in reverse for long distances.

On some larger industrial trucks, which have correspondingly roomier driver's cabs, the driver's seat can swivel around a vertical axis, preferably by 180°. Certain control elements can be moved along with the driver's seat. However, generally there are two steering wheels or two foot spaces. In this manner, the driver is able to assume an ergonomically safe, comfortable and efficient position even while driving in reverse.

On smaller industrial trucks, the space available inside the driver's cab does not permit the installation of two foot spaces and two sets of foot pedals for a swivelling driver's seat. The object of this invention is to make available an industrial truck which has a driver's seat, the position of which can be modified for travel in reverse, whereby the space available is utilized efficiently.

SUMMARY OF THE INVENTION

The above object can be achieved if the axis of rotation of the driver's seat is at some distance from the driver's seat at a position closer to the foot space than to the driver's seat.

The location of the axis of rotation of the driver's seat in the present invention provides certain advantages. When the driver's seat is swivelled, the distance between the seat and the foot space, which contains the pedals and/or the shelf for the driver's feet, remains essentially the same. The operator can leave his feet in the same foot space in any position of the driver's seat, thereby making the most efficient use of the space available.

In one embodiment of the invention, at least one pedal is located in the foot space. The pedal can be comfortably and efficiently actuated by the operator in any position of the driver's seat. The axis of rotation of the driver's seat may be located in the vicinity of the pedal. The distance of the driver from the pedal then remains substantially constant during the swivelling of the driver's seat.

In one embodiment of the invention, the maximum swivelling angle of the driver's seat is less than or equal to 90°. When the driver's seat is rotated by 90°, the driver is sitting at right angles to the direction of travel. He is therefore always able to see, in the same ergonomically efficient manner, both in the direction of the load and in the opposite direction. Under these conditions, the accelerator pedal can be actuated at any time.

In one embodiment of the present invention, the driver's seat has a maximum swivelling angle between 30° and 45°. Even in the limited space of smaller forklift trucks, it is possible to swivel the driver's seat by this angular amount. Even these angles provide a significant ergonomic improvement over the prior art. In particular, a reduced twisting of the spinal column of the operator is present when the truck is traveling in reverse. The pedal can be operated by a similar actuation direction in any possible position of the driver's seat.

In one embodiment of the invention, the pedal can be swivelled around an at least approximately vertical axis of rotation. A swivelling device for the pedal is connected to a swivelling device for the driver's seat. The pedal is thereby swivelled along with the driver's seat so that it can always be moved by the driver in the same actuation direction. The axis of rotation of the driver's seat and the axis of rotation of the pedal essentially coincide. The driver's seat and the pedal may be fastened to a common rotating platform, for example.

In one embodiment of the invention, the industrial truck has at least two pedals which can be actuated with the operator's feet. A first pedal is the actuation mechanism for forward travel, and a second pedal is the actuation mechanism for reverse travel. The axis of rotation is located in the vicinity of the second pedal, i.e., reverse. The position of the second pedal relative to the driver's seat thereby changes very little as the seat swivels. This location of the axis of rotation also guarantees that during reverse travel when the driver's seat is in the swivelled position, the pedal for controlling the reverse travel is within optimum reach. In this embodiment, no device to swivel the pedal is necessary.

The pedal used to actuate reverse travel may have a two-part actuation surface, wherein the second actuation surface is at an angular offset with respect to the first actuation surface around an axis which has a vertical component. The axis around which the actuation surface of the pedal is angularly offset may be substantially vertical. The operator's foot is thereby prevented from slipping off, because in every position of the driver's seat, the driver's foot rests on the respective pedal surface in a perpendicular position. The same positive affect may be achieved if the pedal for the actuation of reverse travel has an actuation surface which is curved around an axis which has a vertical component. The axis about which the actuation surface is curved may be substantially vertical.

In an additional embodiment, the pedal for the actuation of reverse travel can swivel around an axis which has a vertical component. In this case, the pedal for reverse travel can be optimally positioned at all times with respect to the position of the driver and of the seat. The pivot axis of the pedal may be substantially vertical.

In one embodiment of the invention, when the driver's seat swivels, the driver's seat is automatically moved toward the foot space. As the driver's seat swivels, the driver's seat may also be automatically moved upward in the vertical direction. As a result of these measures, the space occupied by the operator and the driver's seat in this swivelled position can be reduced.

In one embodiment of the invention, at least one control element which can be manually actuated by the operator is fastened to the driver's seat, preferably to an armrest of the driver's seat. The control element thereby remains in a uniform position relative to the operator, even during pivoting of the user's seat. This embodiment may include no pedal in the foot space. When the driver's seat swivels, this embodiment is not subject to any restrictions resulting from the accessibility of pedals.

In one embodiment of the invention, the driver's seat is offset in the lateral direction from the longitudinal center plane of the industrial truck. As a result of this measure, there is sufficient free space inside the industrial truck for the swivelling of the driver's seat.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
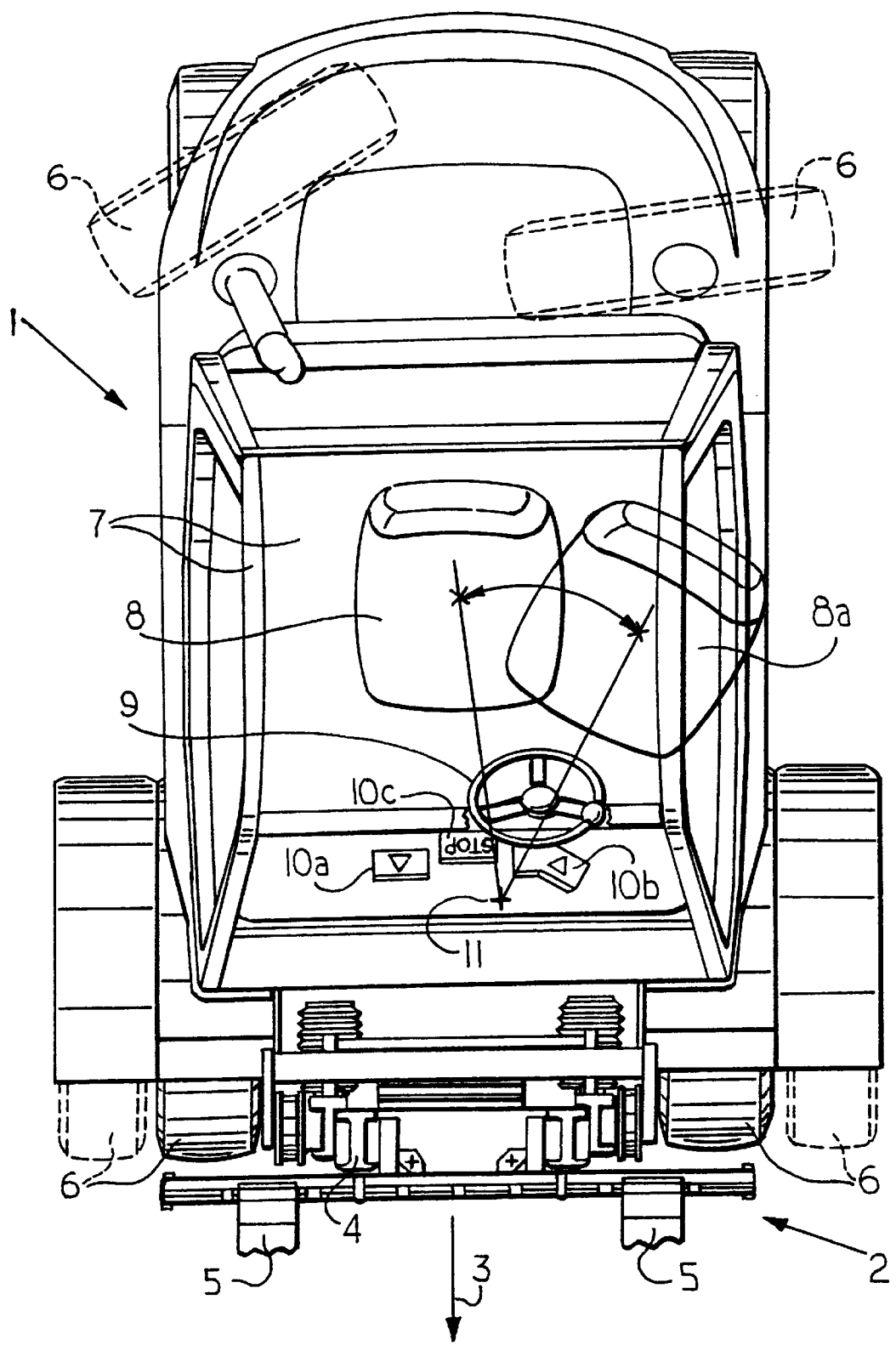
FIG. 1 shows a plan view of an industrial truck according to the invention.

The front seat forklift truck in the drawing includes a vehicle 1 and a load part 2 oriented in the principal or forward direction of travel 3 of the forklift. The load part 2 has a load fork 5 which can move up and down and is fastened to a hoisting frame 4. The vehicle 1 has four wheels 6 in contact with the floor and has a centrally located driver's cab 7.

In the driver's cab 7, in addition to other elements not shown, there are a driver's seat 8, a steering wheel 9 and a plurality of pedals 10a, 10b, and 10c which can be actuated by the operator's foot. The foot space comprises the pedals 10a–c as well as the sections of the floor of the driver's cab 7 which are immediately adjacent to the pedals 10a–c. The pedal 10a is used to control the speed of travel in the forward direction, while the pedal 10b controls the speed of travel in the opposite direction of travel, i.e., reverse. During normal operation, the industrial truck is decelerated or braked by letting up or pulling back on the pedal 10a or 10b which controls the current direction of travel, and if necessary by actuating the pedal 10b or 10a which controls the opposite direction of travel. The pedal 10c is used to actuate a braking system which is not illustrated in any further detail.

The driver's seat 8 can swivel about a vertical axis of rotation 11 located in the vicinity of the pedals 10a–c. In the illustrated embodiment, the axis of rotation 11 is located in the vicinity of the pedal 10b for reverse travel. The position 8a of the driver's seat is also shown at a maximum pivoting angle of approximately 35°.

The driver's seat is swivelled into position 8a, in particular for travel in reverse. As a result of the diagonal position of the driver's seat 8, the bodily position of the operator is improved significantly from an ergonomic point of view, whereby the twisting of the spinal column is reduced. Because the axis of rotation 11 is located in the vicinity of the pedal 10b, the pedal is within optimal reach of the driver even when the driver's seat 8 is swivelled. The pedal 10b has a curved actuation surface, so that the operator's foot can be placed perpendicularly on the respective section of the actuation surface both in the normal position and in the swivelled position 8a of the driver's seat 8.

Figure 2:
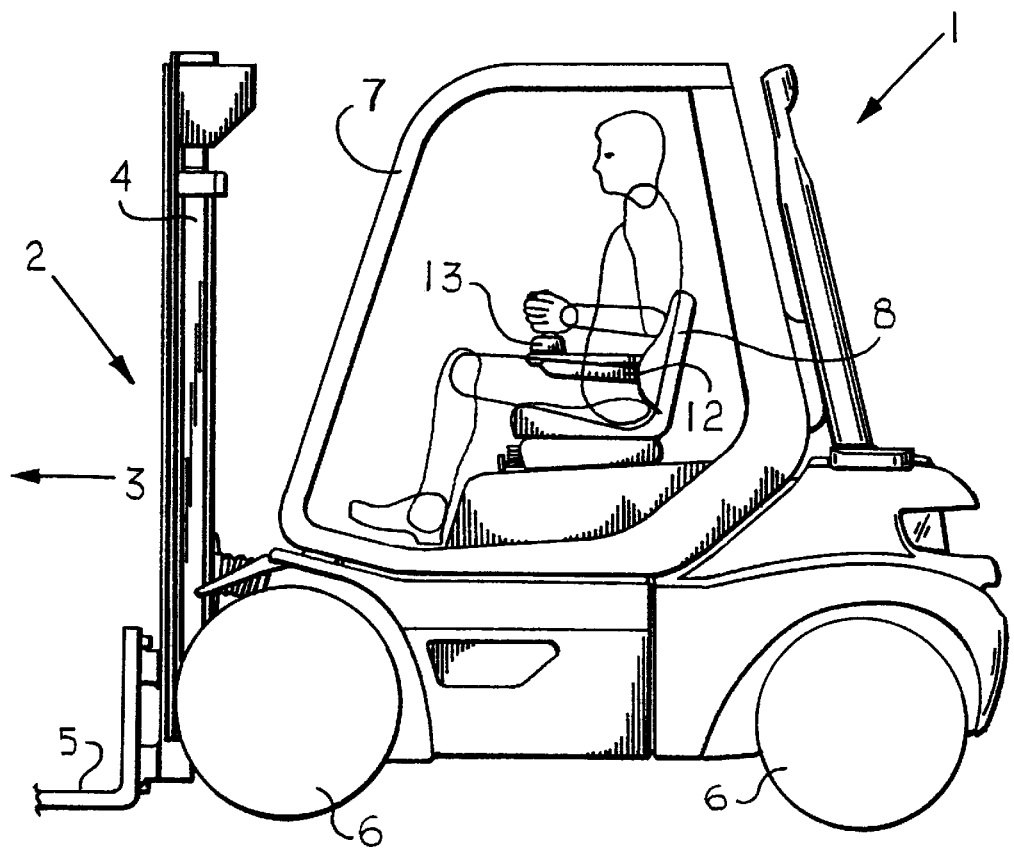
FIG. 2 shows a side view of an industrial truck according to another embodiment of the invention.
Figure 3:
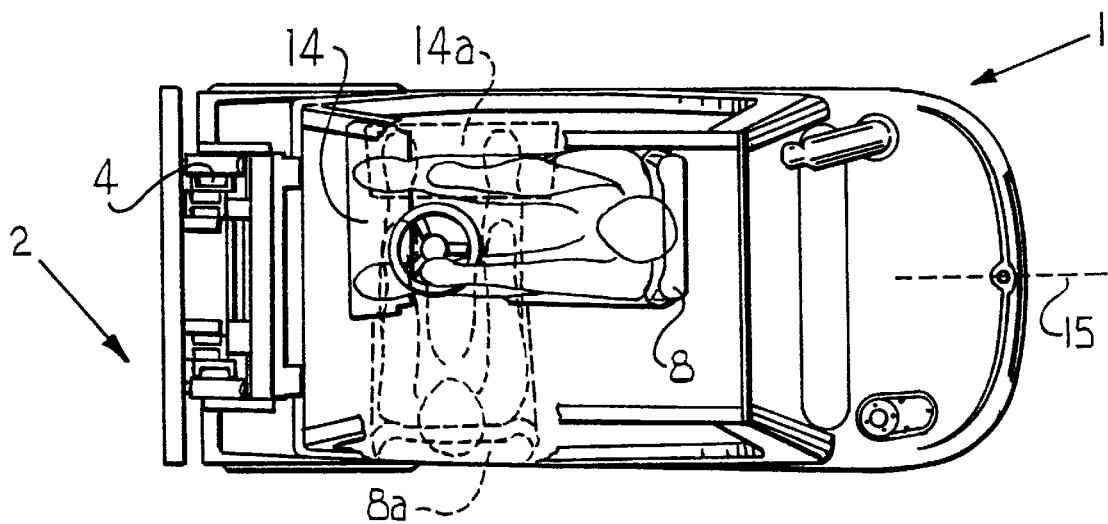
FIG. 3 shows a plan view of an industrial truck according to another embodiment of the invention.

To make possible the pivoting of the driver's seat 8 even on smaller industrial trucks which have correspondingly cramped driver's cabs 7, the normal position of the driver's seat 8, viewed in the principal direction of travel 3, may be located to the right of the center of the driver's cab 7 as shown in the embodiment of FIG. 3. Additionally, the driver's seat 8 may automatically move as it swivels into the position 8a, toward the pedals 10a–c. Simultaneously, the driver's seat 8 may be automatically elevated to promote a more upright position of the operator's body which is schematically illustrated in the embodiment illustrated in FIG. 2. These features would allow for pivoting of the driver's seat 8 in smaller driver's cabs 7.

FIG. 2 shows a side view of an industrial truck according to a second embodiment of the present invention. In this figure, various control elements 13, e.g., for steering or directional controls, are located on an armrest 12 of the driver's seat 8. These control elements 13 can be reached by the driver at all times regardless of the position of the driver's seat 8 which can be pivoted about a substantially vertical axis of rotation.

FIG. 3 is a plan view of an additional embodiment of an industrial truck according to the present invention. The driver's seat 8 includes control elements which can be normally actuated by the operator. The driver's seat 8 is illustrated in its normal position by solid lines, and in its 90° swivelled position by dot-dash lines. A shelf 14 for the feet is also shown in a normal position, and is illustrated in its swivelled position 14a by dashed lines. The three-dimensional position of the foot space formed by the shelf 14 changes very little.

The common center of rotation of the driver's seat 8 and of the shelf 14 is located between the driver's seat 8 and the foot space, whereby it is closer to the foot space than to the driver's seat 8. The driver's seat 8 is offset laterally in relation to a longitudinal center plane 15 of the vehicle. This placement results in sufficient space inside the industrial truck for the swivelling of the driver's seat 8.

Figure 4:
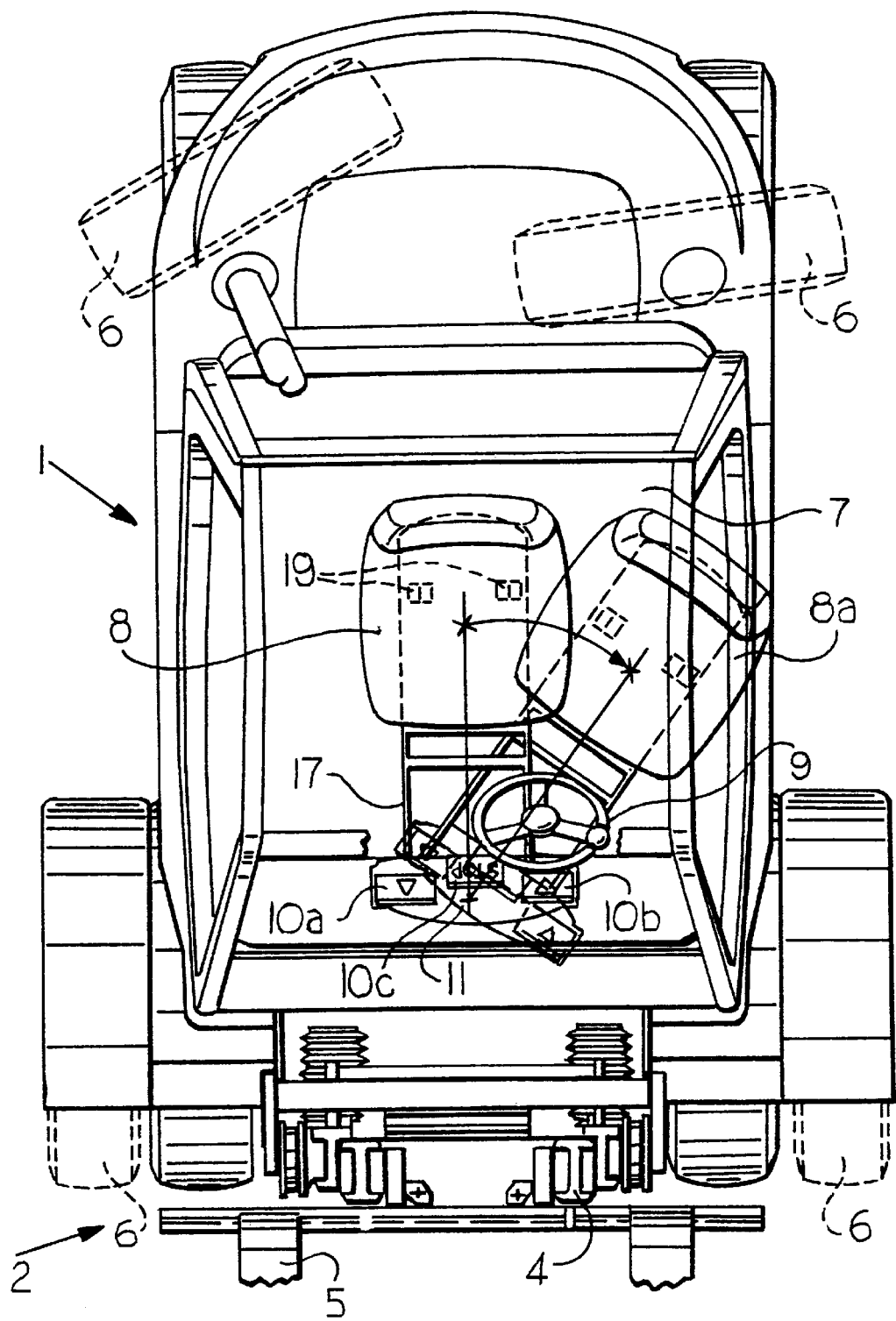
FIG. 4 shows a plan view of an industrial truck according to another embodiment of the invention.

FIG. 4 is a plan view of an additional embodiment of the present invention. In this embodiment, the pedals 10a–c and the driver's seat 8 are mounted on a common support frame 17 which can pivot about the axis 11. Rollers 19, which support the weight of the driver's seat 8 and the driver are attached to the support frame 17. Flexible couplings (not shown) are provided for the pedals 10a–c to accommodate the pivoting of the support frame 17.

While the invention is described in detail herein, it will be appreciated by those skilled in the art that various modifications and alternatives to the arrangements can be developed in light of the overall teachings of the disclosure. Accordingly, the particular arrangements are illustrative only and are not limiting as to the scope of the invention which is to be given the full breadth of the appended claims and any and all equivalents thereof.

What is claimed is:

1. An industrial truck comprising:

a non-pivotable member defining a driver's cab;

a driver's seat within said driver's cab, said driver's seat pivotable relative to said driver's cab about a substantially vertical axis of rotation; and a foot space within said driver's cab corresponding to said driver's seat, wherein said axis of rotation is spaced from said driver's seat and is positioned closer to said foot space than to said driver's seat.

2. An industrial truck as claimed in claim 1, wherein at least one pedal is located in said foot space.

3. An industrial truck as claimed in claim 1, wherein said axis of rotation is located in the vicinity of said foot space.

4. An industrial truck as claimed in claim 1, wherein a maximum swivelling angle of said driver's seat about said axis of rotation is less than or equal to 90°.

5. An industrial truck as claimed in claim 4, wherein said maximum swivelling angle of said driver's seat is between 30° and 45°.

6. An industrial truck as claimed in claim 2, wherein said at least one pedal can swivel around said axis of rotation, wherein a swivelling device for said pedal is connected to a swivelling device for said driver's seat.

7. An industrial truck as claimed in claim 2, wherein said axis of rotation of said driver's seat essentially coincides with an axis of rotation of said at least one pedal.

8. An industrial truck as claimed in claim 2, wherein said industrial truck has at least two of said pedals which can be actuated by the operator's feet, wherein a first pedal is an actuation mechanism for forward travel, and a second pedal is an actuation mechanism for reverse travel, and said axis of rotation is located in the vicinity of said second pedal.

9. An industrial truck as claimed in claim 8, wherein said second pedal has a two-part actuation surface, whereby a second actuation surface is at an angular offset with respect to a first actuation surface.

10. An industrial truck as claimed in claim 8, wherein said second pedal has a curved actuation surface.

11. An industrial truck as claimed in claim 8, wherein said second pedal can pivot around an axis which has a vertical component.

12. An industrial truck as claimed in claim 1, wherein when said driver's seat pivots, said driver's seat is moved toward said foot space.

13. An industrial truck as claimed in claim 1, wherein said driver's seat is offset in a lateral direction with respect to a longitudinal center plane of said industrial truck.

14. An industrial truck as claimed in claim 1, wherein at least one control element which can be manually actuated by the operator is fastened to said driver's seat.

15. An industrial truck as claimed in claim 1, further including a control element which can be manually actuated by the operator to control the travel of said truck, and wherein there are no pedals in said foot space.

16. An industrial truck comprising:

a driver's seat pivotable about a substantially vertical axis of rotation; and a foot space corresponding to said driver's seat, wherein said axis of rotation is spaced from said driver's seat and is positioned closer to said foot space than to said driver's seat, wherein when said driver's seat pivots, said driver's seat is moved upward in a vertical direction.

17. An industrial truck comprising:

a load part having a vertically movable load fork fastened to a hoisting frame;

a truck frame body coupled to said load part, said truck frame body including a cab frame defining a centrally located driver's cab; and a driver's seat within said driver's cab, said driver's seat pivotable within and relative to said driver's cab about a vertical axis, said vertical axis within said driver's cab and spaced from said driver's seat.

18. An industrial truck as claimed in claim 17, wherein when said driver's seat pivots, said driver's seat is moved upward in a vertical direction.

19. An industrial truck as claimed in claim 17, wherein at least one foot pedal is located in said driver's cab and wherein said at least one foot pedal can swivel about said axis of rotation, wherein a swivelling device for said pedal is connected to a swivelling device for said driver's seat.

20. An industrial truck as claimed in claim 17, wherein at least one foot pedal is located in said driver's cab and wherein said axis of rotation of said driver's seat is located substantially at said at least one foot pedal.

* * * * *